(12) United States Patent
Sugawara (10) Patent No.: US 11,678,062 B2
(45) Date of Patent: Jun. 13, 2023

(54) IMAGE CAPTURING APPARATUS, CONTROL METHOD THEREOF, AND STORAGE MEDIUM FOR PERFORMING EXPOSURE CONTROL BY PRIORITIZING INCREASING AN IMAGE CAPTURING SENSITIVITY

(71) Applicant: CANON KABUSHIKI KAISHA, Tokyo (JP)

(72) Inventor: Atsushi Sugawara, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/720,181

(22) Filed: Apr. 13, 2022

(65) Prior Publication Data

US 2022/0337736 A1    Oct. 20, 2022

(30) Foreign Application Priority Data

Apr. 20, 2021   (JP) .............................. JP2021-071334

(51) Int. Cl.
*H04N 23/73*   (2023.01)
*H04N 23/745*   (2023.01)

(52) U.S. Cl.
CPC ........... *H04N 23/73* (2023.01); *H04N 23/745* (2023.01)

(58) Field of Classification Search
CPC .... H04N 5/2353; H04N 5/2357; H04N 23/73; H04N 23/745; H04N 23/71
See application file for complete search history.

(56) References Cited

U.S. PATENT DOCUMENTS

2016/0006919 A1*  1/2016  Aoyama ............... G01J 1/4214
                                                          348/226.1

FOREIGN PATENT DOCUMENTS

JP          2017011352 A     1/2017
JP          2020080512 A     5/2020

* cited by examiner

*Primary Examiner* — Twyler L Haskins
*Assistant Examiner* — Angel L Garces-Rivera
(74) *Attorney, Agent, or Firm* — Canon U.S.A., Inc. IP Division (57) ABSTRACT

An apparatus comprises a sensor configured to capture a subject; and a control unit configured to perform exposure control for when capturing a subject using the sensor by adjusting at least an accumulation period, a diameter of an aperture of a diaphragm, and an image capturing sensitivity, wherein the control unit, in a case of capturing a subject to obtain an image for detection, which is an image for detecting a flicker by using the sensor, performs exposure control by prioritizing increasing an image capturing sensitivity and opening the aperture of the diaphragm rather than increasing an accumulation period of the sensor.

18 Claims, 7 Drawing Sheets

| | | DETERMINATION RESULT IN FIG. 7A | |
|---|---|---|---|
| | | 100Hz | NOT 100Hz |
| DETERMINATION RESULT IN FIG. 7B | 120Hz | DC | 120Hz |
| | NOT 120Hz | 100Hz | DC |

IMAGE CAPTURING APPARATUS, CONTROL METHOD THEREOF, AND STORAGE MEDIUM FOR PERFORMING EXPOSURE CONTROL BY PRIORITIZING INCREASING AN IMAGE CAPTURING SENSITIVITY

BACKGROUND

Technical Field

The aspect of the embodiments relates to a technique for detecting a flicker in an image capturing apparatus.

Description of the Related Art

With the recent increase in ISO (high sensitivity) of digital cameras, capturing with a high-speed shutter is becoming possible even under artificial light sources that flicker. A high-speed shutter has a benefit of being able to capture images without blur when capturing indoor sports and the like; however, when capturing under a flickering light source, exposure and colors of images may be uneven between frames or even within one frame due to the flicker.

For such issues, a method of reducing the effect of a flicker on an image by performing exposure at the peak position of the flicker where there is the least change between light and dark or by setting an exposure period to an integer multiple of a flicker cycle is known.

To use such a technique of reducing the effect of a flicker, the flicker and its frequency are detected. For detection of flicker and its frequency, the technique disclosed in Japanese Patent Laid-Open No. 2017-11352, for example, is known. Japanese Patent Laid-Open No. 2017-11352 indicates an example in which light is measured a plurality of times in a fixed cycle, and the presence or absence and the frequency of a flicker is determined from a first evaluation value obtained from a photometric value obtained at a first interval, which is almost in phase with the flicker, and a second evaluation value obtained from a photometric value obtained at a second interval, which is almost in opposite phase with the flicker, among photometric values that have been obtained over the plurality of times.

Further, Japanese Patent Laid-Open No. 2020-80512 discloses an image capturing apparatus that enables execution of a flicker detection operation during a so-called live view display, without stopping the live view display.

However, the prior art disclosed in Japanese Patent Laid-Open No. 2017-11352 described above presumes that, at the time of exposure of an image for flicker detection, exposure conditions, such as aperture, do not change, and the brightness of a subject is changed only due to a flickering light source. If this premise is not met, the performance of flicker detection will decrease.

Meanwhile, in the technique disclosed in Japanese Patent Laid-Open No. 2020-80512, during a live view display, the exposure and focus to a preferred state for the user are constantly controlled. Therefore, there is an issue that when an attempt is made to perform a flicker detection operation during a live view display, exposure conditions for an image for flicker detection change due to changes in exposure and focus during the live view display.

SUMMARY

According to a first aspect of the embodiments, there is provided an apparatus comprising: a sensor configured to capture a subject; and at least one processor; and a memory coupled to the at least one processor, the memory having instructions that, when executed by the processor, performs operations as: a control unit configured to perform exposure control for when capturing a subject using the sensor by adjusting at least an accumulation period, a diameter of an aperture of a diaphragm, and an image capturing sensitivity, wherein the control unit, in a case of capturing a subject to obtain an image for detection, which is an image for detecting a flicker by using the sensor, performs exposure control by prioritizing increasing an image capturing sensitivity and opening the aperture of the diaphragm rather than increasing an accumulation period of the sensor.

According to a second aspect of the embodiments, there is provided a method of controlling an apparatus having a sensor configured to capture a subject, the method comprising: performing exposure control for when capturing a subject using the sensor by adjusting at least an accumulation period, a diameter of an aperture of a diaphragm, and an image capturing sensitivity, wherein in the exposure control, in a case of capturing a subject to obtain an image for detection, which is an image for detecting a flicker by using the sensor, exposure control by prioritizing increasing an image capturing sensitivity and opening the aperture of the diaphragm rather than increasing an accumulation period of the sensor is performed.

Further features of the disclosure will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the disclosure. Multiple features are described in the embodiments, but limitation is not made to the disclosure that requires all such features, and multiple such features may be combined as appropriate. Furthermore, in the attached drawings, the same reference numerals are given to the same or similar configurations, and redundant description thereof is omitted.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In an embodiment of the disclosure, a so-called digital mirrorless camera will be described as an example of an image capturing apparatus. However, the disclosure is not limited thereto and may be various electronic devices having a camera function. For example, an image capturing apparatus according to the disclosure may be a mobile communication terminal with a camera function such as a mobile phone or a smartphone, a portable computer with a camera function, a portable game device with a camera function, or the like.

Figure 1:
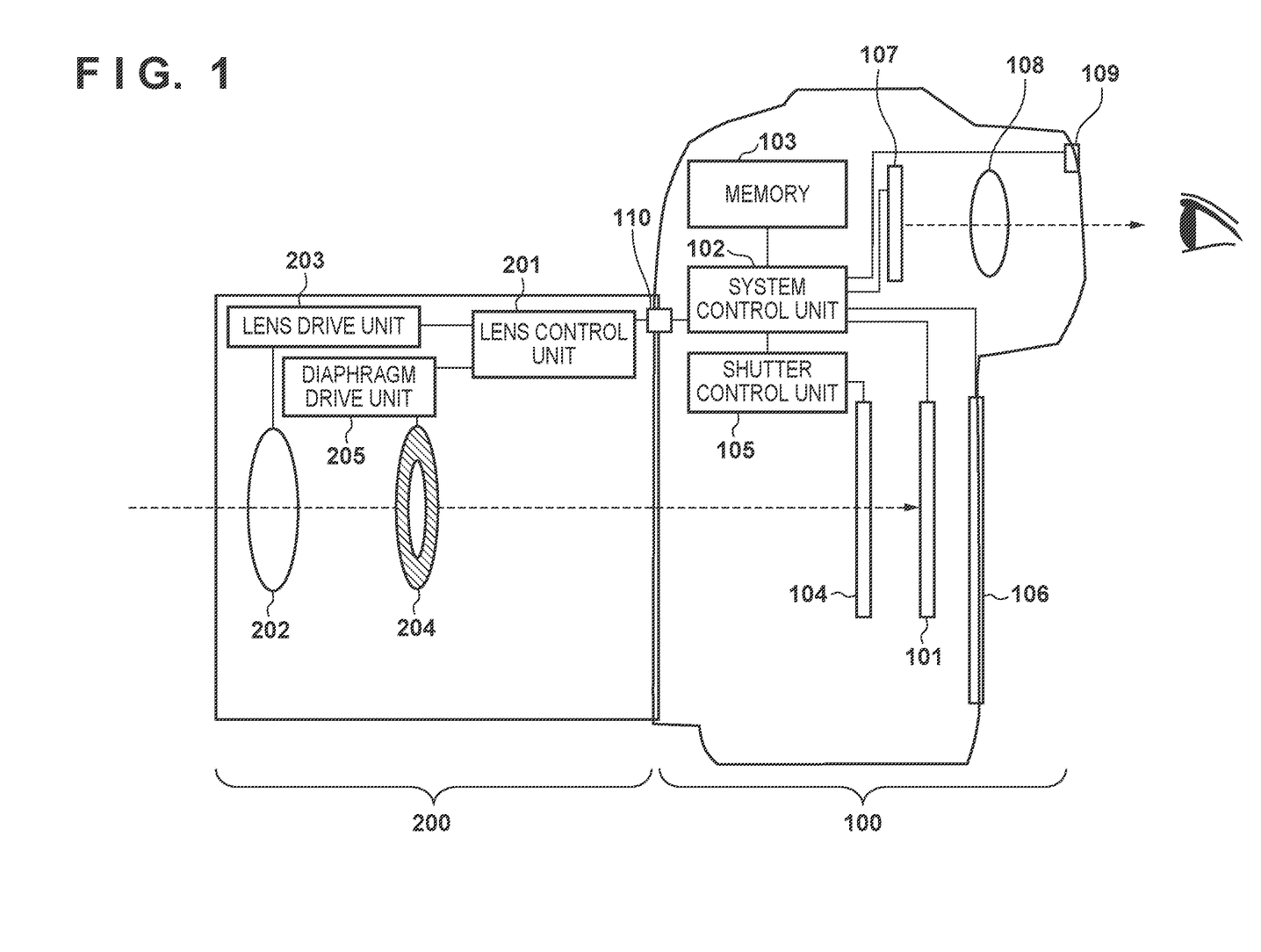
FIG. 1 is a diagram illustrating a schematic configuration of a digital mirrorless camera, which is an embodiment of an image capturing apparatus of the disclosure.

FIG. 1 is a diagram illustrating a schematic configuration of a digital mirrorless camera (hereinafter, referred to as a camera), which is an embodiment of an image capturing apparatus of the disclosure.

In FIG. 1, the camera is roughly divided into and configured by a camera body 100 and a photographing lens 200, both of which are mechanically and electrically connected via a lens mount mechanism 110. In the present embodiment, the photographing lens 200 for forming a subject image is configured to be capable of attaching to and detaching from the camera body 100 but may be integrated with the camera body 100.

First, the camera body 100 will be described. An image sensor 101 includes an infrared cut filter, a low-pass filter, or the like and is an image sensor including a photoelectric conversion element of a CMOS type or the like. An optical image of a subject is photoelectrically converted by the image sensor 101 and is outputted as image signals. A shutter 104 is closed when not capturing, shielding the image sensor 101, and is opened at the time of live view (LV) or when capturing, guiding incident light passing through the photographing lens 200 to the image sensor 101.

A system control unit 102 is an arithmetic processing unit for controlling each unit of the camera body 100. A memory 103 includes a ROM for storing programs, variables, and the like to be executed by the system control unit 102 and a RAM having a work area where the system control unit 102 deploys a program and a storage area for temporary image data and the like.

Further, the system control unit 102 is connected to a lens control unit 201 via the lens mount mechanism 110. The lens control unit 201 controls the position of a focusing lens 202 via a lens drive unit 203. Further, the lens control unit 201 controls a diaphragm 204 via a diaphragm control unit 205. More specifically, control is performed by the system control unit 102 performing calculation related to AE (automatic exposure)/AF (automatic focus adjustment) from an image acquired by the image sensor 101 and communicating the position and the aperture value of the focusing lens that accords with the calculation result to the lens control unit 201.

Further, the shutter 104 is also connected to the system control unit 102 via the shutter control unit 105 and exposes the image sensor 101 for an exposure period that accords with the calculation result of the system control unit 102.

Next, an operation of displaying an image acquired by the image sensor 101 will be described. Here, an operation in a so-called live view mode, in which continuous capturing is performed by the image sensor 101 and the user observes a subject by displaying the captured images on a display unit in real time, will be described.

There are two types of display destination of images acquired by the image sensor 101: a rear monitor 106 and a viewfinder display unit 107; and images are displayed while switching these. The switching is performed based on the detection result of an eye approach detection unit 109. Specifically, when it is detected that the user is in an eye approached state, an image is displayed on the viewfinder display unit 107. The user looks into the viewfinder and confirms a subject displayed on the viewfinder display unit 107 via an eyepiece 108. Meanwhile, when it is detected by the eye approach detection unit 109 that the user is not in an eye approached state, an image is displayed on the rear monitor 106.

Next, the driving of the image sensor 101 in the live view mode will be described with reference to FIG. 2. In the present embodiment, it is assumed that the image sensor 101 has a drive mode for acquiring a live view display image in which pixel rows are read out at predetermined intervals and a drive mode for flicker detection in which pixel rows that are not read out in the drive mode for live view display are read at predetermined intervals. Also, it is assumed that control, in which the driving mode for flicker detection is executed a plurality of times within one cycle of the driving mode for live view display, is possible.

Figure 2:
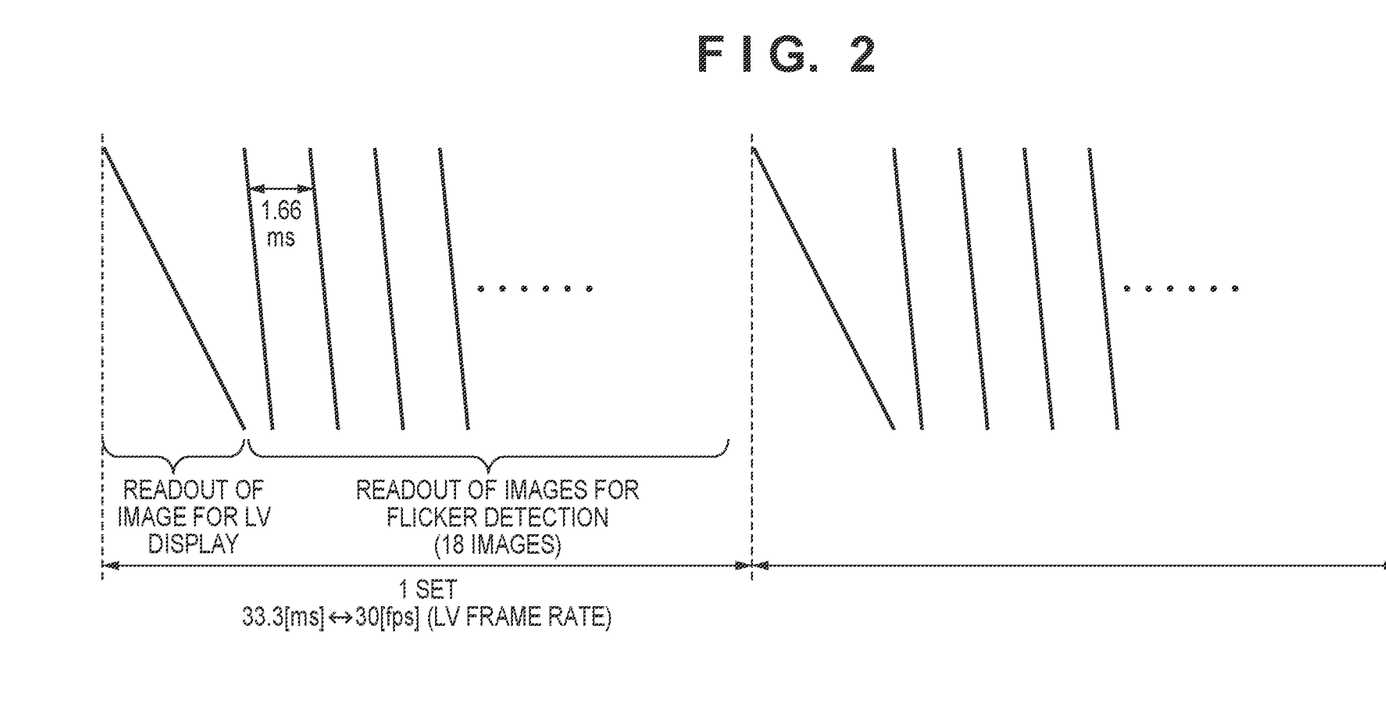
FIG. 2 is a diagram for explaining driving of an image sensor during live view.

FIG. 2 illustrates this drive mode; the horizontal direction indicates time, the vertical direction indicates the vertical position of the image sensor 101, and the diagonal lines in the figure indicates the read timing of the image sensor 101 during the live view mode.

As illustrated in FIG. 2, firstly, one image for live view display is read out, then a plurality of images for flicker detection are read out (a capturing period for images for flicker detection). This acquisition of an image for live view and a plurality of images for flicker detection is set as one set, and this set of operations is repeated. The acquisition of an image for live view and images for flicker detection is performed by an electronic shutter operation of the image sensor 101.

A plurality of images for flicker detection are captured at 600 fps (1.66 ms intervals). In the present embodiment, if one set is repeated at 33.3 [ms] cycles, this cycle becomes the frame rate of live view display: 1 (s)/33.3 (ms)=30 [fps]. In addition, within one set, 18 images for flicker detection can be acquired. A readout of the latter half of images for flicker detection in one set is not essential and can be omitted. Although details will be described later, generally, a flicker state of a capturing environment depends on the light sources present in that environment and is unlikely to change in a short time. Therefore, the frequency of a flicker detection operation does not need to be so high. In the present embodiment, it is assumed that the flicker detection operation is performed once every six live view frames.

Figure 3:
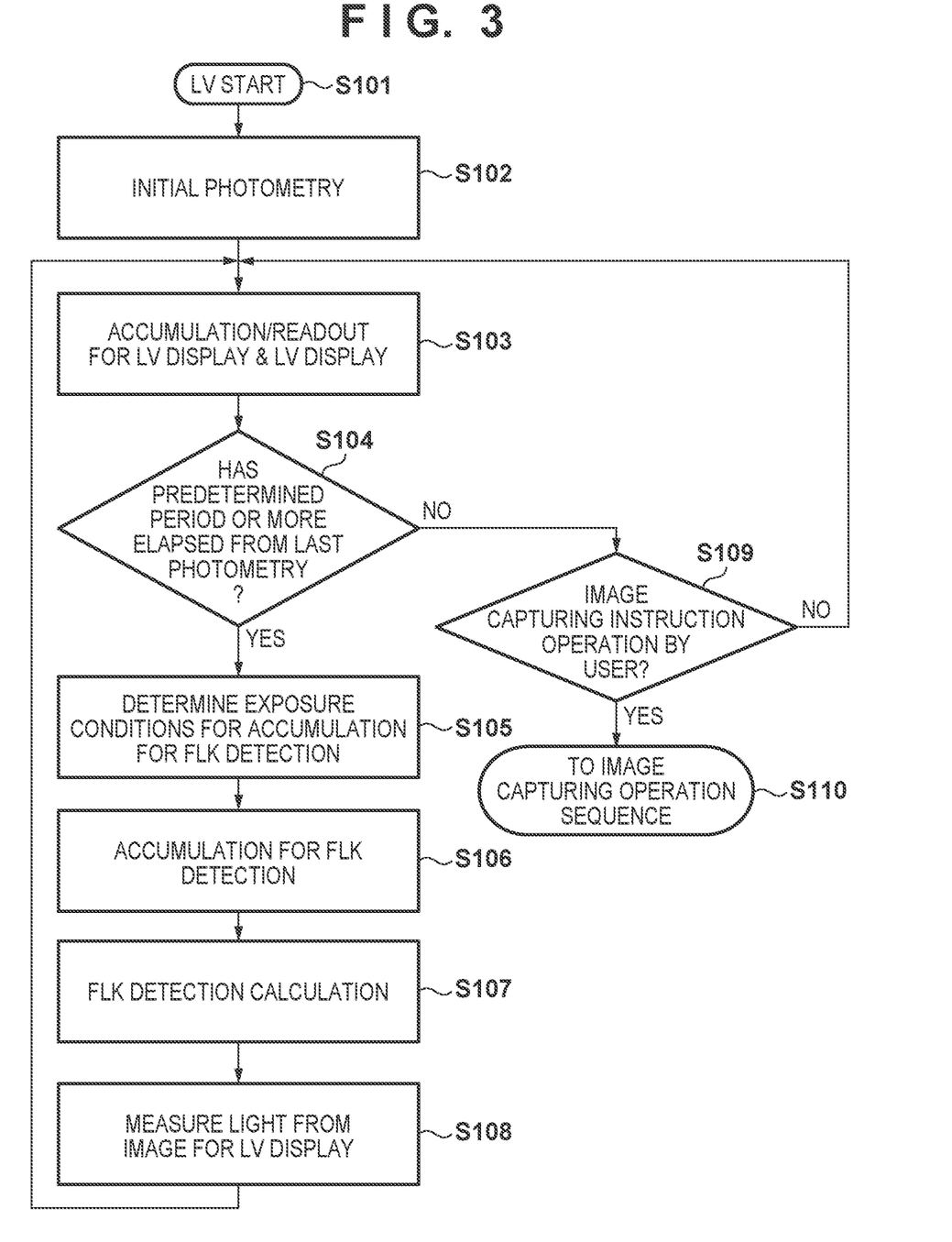
FIG. 3 is a flowchart illustrating a flicker detection operation during live view.

Next, a flicker detection operation during live view in the camera of the present embodiment will be described with reference to FIG. 3. The operation of the flowchart of FIG. 3 is realized by the system control unit 102 deploying and executing, in the RAM, a program stored in the ROM of the memory 103.

Upon receiving an instruction to start operation for live view in step S101, firstly, the system control unit 102 measures light in step S102 before starting a live view display so that exposure failure such as overexposure or underexposure does not occur when capturing an image for the first frame of live view which is displayed first.

Specifically, a single image is first captured with fixed exposure control values (a combination of AV (aperture value), TV (shutter speed, accumulation period), and ISO sensitivity (capturing sensitivity)) that have been predetermined. If this image output exceeds a predetermined appropriate exposure level, for example, the exposure control values are fed back so that the output of an image becomes an appropriate exposure level by shortening TV for the next image or the like. Capturing is performed a plurality of times as necessary until exposure control values with which proper exposure can be achieved are ascertained; however, live view is not displayed. When the exposure control values with which proper exposure can be obtained are ascertained, the process proceeds to step S103. The operation of obtaining, from an image output and exposure control values at the time of acquiring the image, the exposure control values with which proper exposure can be obtained shall hereinafter be referred to as "photometry".

In step S103, the system control unit 102 captures an image of the first frame of live view using the control values for which photometry has been performed in step S102 and displays the image on the rear monitor 106 or the viewfinder display unit 107. After step S102, the user can observe and frame a subject by confirming the rear monitor 106.

In step S104, the system control unit 102 determines elapsed time since the last photometry timing. Then, if a predetermined time has elapsed, the process proceeds to step S105; otherwise, the process proceeds to step S109.

Under an environment in which the user performs capturing, brightness changes in accordance with factors such as the change of a subject and panning by the user; therefore, photometry at a fixed frequency is performed. Similarly, in one embodiment, flicker detection is performed at a fixed frequency since it is conceivable for the user to move from indoors where a flicker is present to outdoors under sunlight and the like.

From the above, in the present embodiment, the predetermined time in step S104 is set to 200 ms. As described above, since the frame rate of live view display is 30 fps here, photometry and the flicker detection operation are performed once every six frames.

Once photometry is performed, 6 frames of live view display thereafter are captured with the same exposure control values; then, photometry is performed again using the image of the sixth frame so that the exposure control values for the next six frames are determined. In this case, the driving of the image sensor for the sixth frame is an operation of capturing a set of an image for live view display and images for flicker detection as illustrated in FIG. 2. Since flicker detection is not performed for other frames, acquisition of images for flicker detection in the latter half of the operation for the set shall be omitted.

In the present embodiment, the frequency of photometry and flicker detection is set to be once every six frames but may be changed to a frequency such as once every four frames, or the frequency of photometry and the frequency of flicker detection may be set separately. In step S104, when it is determined that 200 ms or more has elapsed since the system control unit 102 has performed the last photometry, the process proceeds to step S105 in which photometry and the flicker detection operation are performed. Further, if it is determined that 200 ms has not elapsed, the process proceeds to step S109.

Next, a process of performing the photometric operation and the flicker detection operation in steps S105 to S108 will be described.

In step S105, the system control unit 102 determines the exposure control values of images for flicker detection. Although details will be described in step S107, generally in the flicker detection operation, the larger the amplitude ratio of brightness of a flicker to be detected, the more stably the flicker can be detected. Since the amplitude ratio of the flicker is determined by a light source and a subject in a capturing environment, it cannot be controlled on the camera side, but by designing an exposure operation for flicker detection, it is possible to increase the superficial amplitude ratio in detection.

Figure 4:
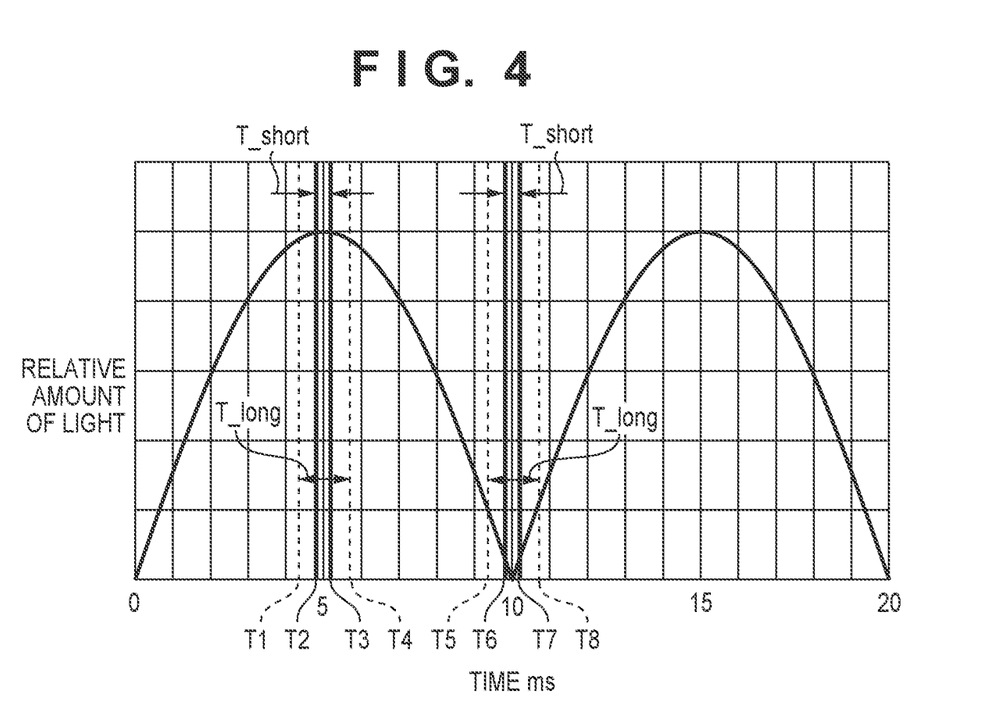
FIG. 4 is a diagram illustrating a relationship between an exposure period and an output obtained under a flicker environment.

Specifically, when the exposure period of an image to be acquired for flicker detection is shortened, the superficial amplitude ratio increases; this will be described with reference to FIG. 4. FIG. 4 is a graph illustrating a change in the amount of light due to a standard 100 Hz flicker, with time on the horizontal axis and the relative amount of light on the vertical axis. In this figure, the timings at which exposure for images for flicker detection is performed under such a light source as described above are indicated by T1 to T8.

When detecting flicker, capturing is performed a plurality of times at cycles that are fast enough with respect to the frequency of the flicker, and the flicker is detected from the average output of each of the obtained plurality of images. Here, a case where exposure for images for flicker detection is performed close to the timing at the bottom and the timing at the peak of the amount of light of the flicker is considered, for example. In FIG. 4, a full-screen average output of an image captured in a period T2 to T3 (time width T_short) near the peak timing of the flicker is set as A(T2, T3). Similarly, a full-screen average output of an image captured for a period T6 to T7 with the same time width T_short near the bottom timing of the flicker is set as A(T6, T7). In this case, a superficial amplitude ratio AMP_short for detection is calculated by the following equation.

$$\text{AMP\_short} = A(T2, T3)/A(T6, T7)$$

Meanwhile, an amplitude ratio AMP_long for when exposure is performed similarly at the peak timing and bottom timing of the flicker for T_long, which is a longer time width than the above, is calculated by the following equation.

$$\text{AMP\_long} = A(T1, T4)/A(T5, T8)$$

Here, when A(T2, T3) and A(T1, T4) are compared, since the exposure period is shorter for A(T2, T3), exposure is only performed near the peak of the flicker; however, periods before and after reaching the peak are also included in the exposure period for A(T1, T4). Therefore, when an exposure period is converted to per unit of time, A(T2, T3) becomes a larger value than A(T1, T4).

Similarly, when A(T6, T7) and A(T5, T8) near the bottom are compared, exposure is performed only at the bottom for A(T6, T7), while periods before and after reaching the bottom are also included in the exposure period for A(T5, T8). Therefore, when an exposure period is converted to per unit of time, A(T6, T7) becomes a smaller value than A(T5, T8).

From the above, it can be seen that AMP_short>AMP_long, and when acquiring images for flicker detection, the superficial amplitude ratio increases as the exposure period is shortened. In light of this, the step of determining the exposure control values of images for flicker detection is step S105. The exposure control values are determined using so-called program charts from the brightness ascertained from a photometric result. Examples of program charts are illustrated in FIGS. 5A to 5C.

Figure 5A:
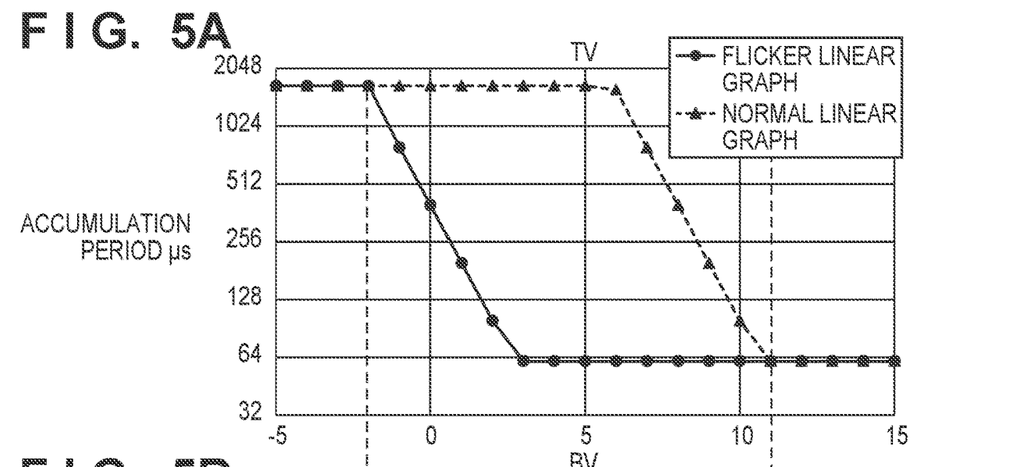
FIGS. 5A to 5C are program charts for determining exposure control values of images for flicker detection.
Figure 5B:
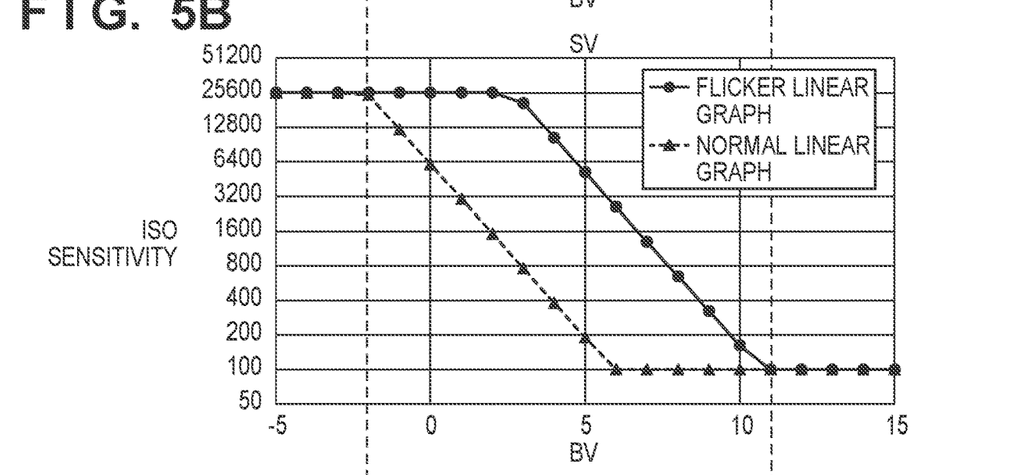
Figure 5C:
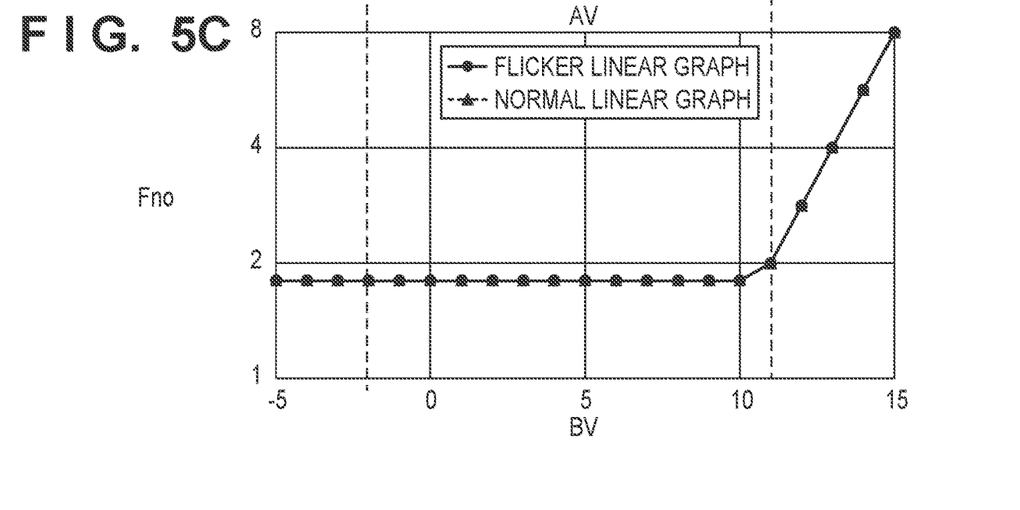

FIGS. 5A to 5C are graphs illustrating program charts with brightness on the horizontal axis and exposure period, ISO sensitivity, and lens aperture values on the vertical axis, respectively. The program charts illustrate the amount of light reaching the image sensor 101, the exposure period of the image sensor 101, the capturing sensitivity, the aperture value, and correspondence relationships therebetween. When the brightness is determined by photometry, the exposure control values are uniquely determined according to this graph.

In FIGS. 5A to 5C, with respect to the program diagrams for capturing images for flicker detection, linear graphs for obtaining the effect unique to the present embodiment (hereinafter, referred to as "flicker linear graphs") are illustrated by a solid line, conventional linear graphs (hereinafter, referred to as "normal linear graphs") are illustrated by a broken line, and both are compared. The shortest exposure period of the image sensor 101 of the present embodiment is $1/16384$ sec ($\approx 61$ μs); since images for flicker detection are acquired at 600 fps, the longest exposure period is 1666 μs. The minimum and maximum ISO sensitivity are 100 and 25600, respectively. For aperture, it is assumed that a lens with a full-open F-number of F1.8 is used.

First, in the bright regions above BV 11 of FIGS. 5A to 5C, the exposure periods are fixed at the shortest 61 μs and the ISO sensitivities are fixed at the lowest 100 for the flicker linear graphs and the normal linear graphs; control is performed such that proper exposure is obtained by adjusting the aperture value. When an image becomes darker than BV 11, the diaphragm opens to F1.8, which is full-open; therefore, in the normal linear graphs, the proper exposure is maintained by extending the exposure period while fixing the ISO sensitivity at 100. In the normal linear graphs, at BV 5 and below, the exposure period reaches the longest of 1666 μs; therefore, the ISO sensitivity is increased from thereon; when it turns darker to BV −2, the ISO sensitivity also reaches the maximum of 25600. Accordingly, since the exposure period is the longest, the ISO sensitivity is the largest, and the aperture is full-open in the regions that are BV −2 and below, exposure cannot be adjusted, and obtained images are underexposed. In the normal linear graphs, in order to avoid image quality deterioration due to an increase in ISO sensitivity as much as possible, as an image becomes darker, the aperture becomes full-open; the ISO sensitivity is increased for the first time after the exposure period becomes the longest.

In normal still image capturing and live view image capturing, in order to avoid image quality deterioration due to an increase in ISO sensitivity as much as possible, the normal linear graphs as described above are used; control is performed so that the ISO sensitivity is raised for the first time after the exposure period becomes the longest.

Next, the flicker linear graphs are considered; as previously described, in one embodiment, the exposure period is shorten as much as possible in flicker detection; therefore, as it turns darker, and after the aperture of the diaphragm becomes full-open at BV 11, the ISO sensitivity is first increased while maintaining the exposure period at the shortest 61 μs. The exposure period starts extending for the first time at BV 2 when the highest ISO sensitivity of 25600 (upper limit on the high sensitivity side) is reached. At BV −2 and below, the exposure period is the longest, the ISO speed is the largest, and the aperture is full-open; therefore, the exposure control values are the same as in the normal linear graphs, and obtained images are underexposed.

When capturing (exposure) for flicker detection, in order to facilitate flicker detection, shorter exposure periods are given priority, and instead, control is performed so as to increase the ISO sensitivity.

As described above, when comparing the two types of linear graphs in FIGS. 5A to 5C, in the range of BV −2 to BV 11, since the exposure periods are shorter for the flicker linear graph than the normal linear graph, flicker can be more easily detected. Thus, the spirit of the present embodiment is, when comparing the exposure control for when capturing images for flicker detection and the exposure control for when capturing a still image or an image for live view display, a shutter speed (exposure period) is set to be on the shorter-seconds side for subjects of the same brightness when performing capturing for flicker detection.

In step S105 of FIG. 3, the exposure control values of the images for flicker detection is determined based on the flicker linear graphs as described above.

After the exposure control values of the images for flicker detection has been determined in step S105, the system control unit 102 actually acquires the images for flicker detection in step S106.

Figure 6A:
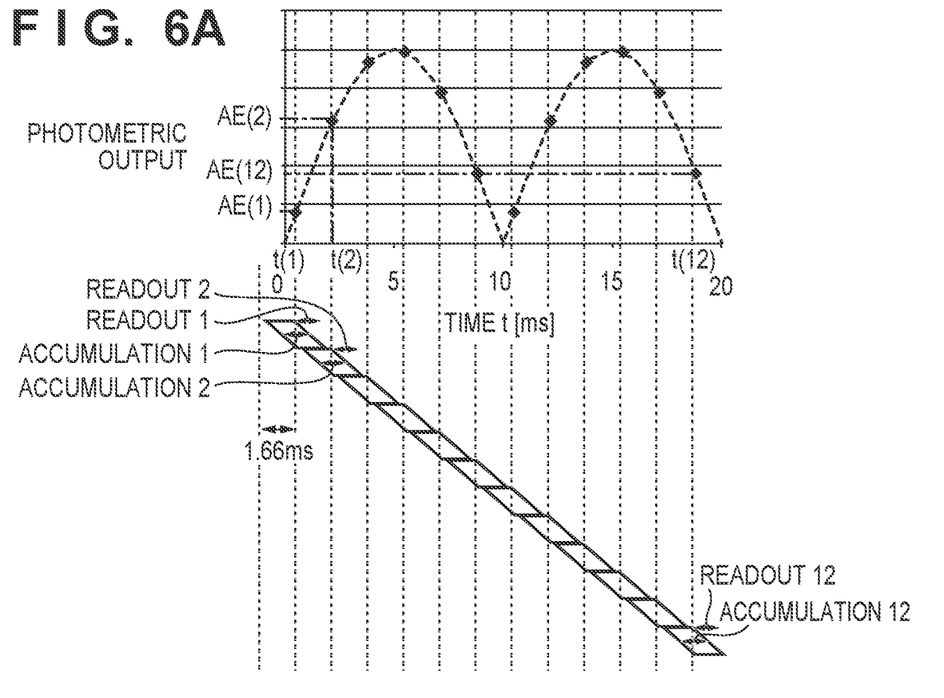
FIGS. 6A and 6B are diagrams illustrating relationships between an acquisition timing and a photometric output of images for flicker detection.

FIG. 6A is a diagram illustrating a temporal change in a signal value when accumulation for flicker detection has been performed, and the flicker of 100 Hz is present. As already illustrated in FIG. 2, in the present embodiment, the image sensor 101 is driven given a set of a readout of an image for live view display followed by 18 readouts of images for flicker detection at intervals of 1.66 ms. The first 12 images out of the 18 images captured at 1.66 ms intervals are used for flicker detection. Accumulation and readout are performed for each of the 12 images; as illustrated in the figure, an n-th accumulation is described as "accumulation n", a signal readout of accumulation n is described as "readout n", and a photometric value (signal value) obtained from the result of readout n is described as "AE(n)". Here, the focus is on the first 12 times of accumulation; therefore, photometric values of AE(1) to AE(12) are obtained. As for the times at which the respective photometric values are acquired, since accumulation is performed for a finite time, they are assumed to be represented by the median value (the position of the center of gravity of the parallelogram in the figure) of the accumulation period and are t(1) to t(12), respectively. In step S106, the system control unit 102 causes the image sensor 101 to acquire images for flicker detection at intervals of 1.66 ms in this manner.

After the images for flicker detection have been acquired in step S106, in step S107, the system control unit 102 performs a flicker detection operation using AE(1) to AE(12).

When calculating flicker detection, the system control unit 102 first calculates an evaluation value to be used to determine flicker frequency from AE(1) to AE(12). In the present embodiment, the evaluation value used to determine flicker frequency is defined by the following equation.

$$SAD(m) = \Sigma_{i=1}^{6}|AE(n) - AE(n+m)|$$

SAD is an abbreviation of Sum of Absolute Difference and is a metric that expresses similarity and is used in the field of pattern matching and the like. m is a numerical value that represents how many times ahead is the photometric value against which the degree of similarity is calculated for an n-th photometric result AE(n) among the 12 times photometry is performed; therefore, SAD(m) is an equation that calculates the degree of similarity with a photometric value after a lapse of (1.66×m) ms. As can be seen from the equation, the higher the similarity, the smaller the value of SAD(m).

For example, in an environment where a flicker of 100 Hz is present, a flicker cycle is about 10 ms, and its relationship with a photometric period of 1.66 ms is 10÷1.66≈6; therefore, as illustrated in FIG. 6A, same photometric values are obtained in the respective six periods of the cycle regardless of the timing of accumulation. That is, the relationship AE(n)≈AE(n+6) holds. From this property, when SAD(6) is calculated in an environment in which a flicker of 100 Hz is present, SAD(6)≈0. In addition, SAD(3) is also calculated to detect the presence of a flicker of 100 Hz. SAD(3) is a value obtained by calculating a similarity with a photometric value after 1.66×3=5 ms has elapsed. In an environment in which a flicker of 100 Hz is present, the photometric value at the timing shifted by 5 ms has a reversed phase relationship; therefore, SAD(3) has a significantly larger value with respect to SAD(6). That is, when SAD(3) is larger and SAD(6) is smaller, it can be considered that a flicker of 100 Hz is present. Further, since SAD(3) is a difference between photometric values at timings in a reversed phase relationship, the value of SAD(3) becomes larger under an environment having a flicker of a larger amplitude.

Figure 6B:
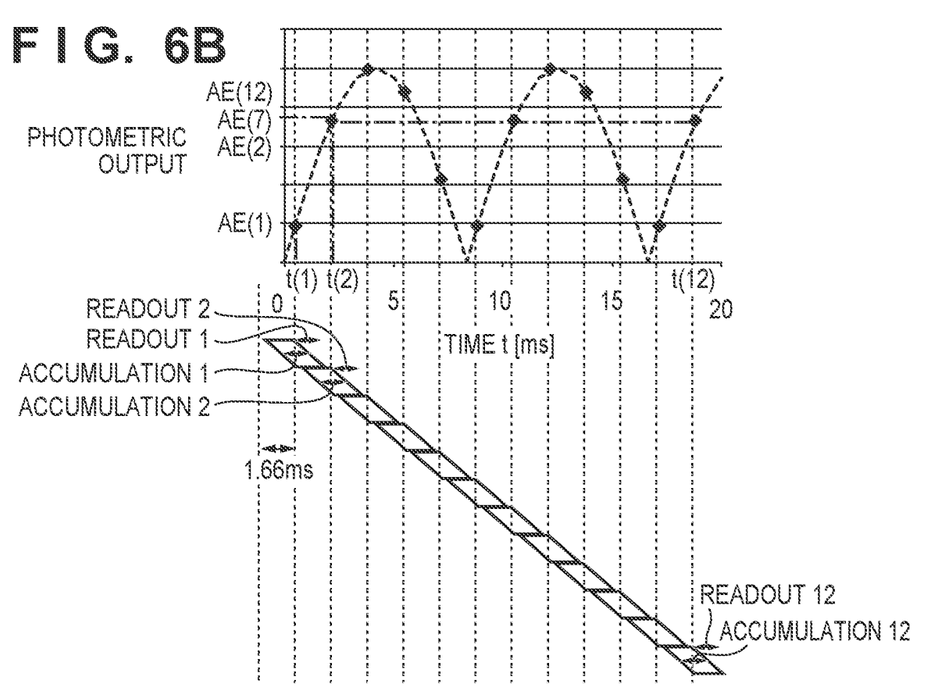

Based on the same concept, SAD(5) and SAD(3) are to be calculated in an environment where a flicker of 120 Hz is present. In an environment where a flicker of 120 Hz is present, a cycle in which the light source is lit is 8.333 ms; as illustrated in FIG. 6B, AE(n)≈AE(n+5) and SAD(5)≈0. Further, for a flicker that is 120 Hz, the relationship enters a completely reversed phase after 4.16 ms has elapsed, and it is ideal to determine a similarity with a waveform after 4.16 ms has elapsed. However, 4.16 ms is not an integer multiple of a frame period, which is 1.66 ms; therefore, as a value relatively close to this, it is substituted by the value of SAD(3), which indicates the similarity with the waveform after 5 ms has elapsed. Even in an environment where a flicker of 120 Hz is present, SAD(3) indicates the similarity close to a reversed phase; therefore, SAD(3) becomes a significantly larger value with respect to SAD(5); in addition, the larger the amplitude of flicker, the larger the value of SAD(3).

Figure 7A:
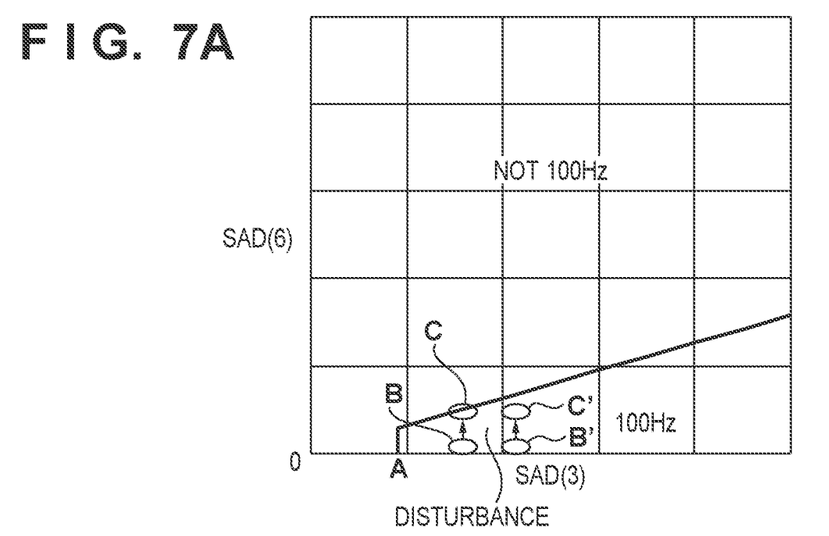
FIGS. 7A to 7C are diagrams illustrating a method of determining the presence of a flicker.

From the above, SAD(6), SAD(5), and SAD(3) are calculated, and the final flicker frequency determination is performed using these. As already described, in an environment where a flicker of 100 Hz is present, SAD(3) becomes a significantly larger value than SAD(6). Therefore, when considering a plane as illustrated in FIG. 7A with SAD(3) on the horizontal axis and SAD(6) on the vertical axis, in an environment where a flicker of 100 Hz is present, plots are obtained in a relatively lower right region of this plane. That is, if a region is divided as illustrated in FIG. 7A and set as a region determined to be 100 Hz and a region determined not to be 100 Hz, it becomes possible to determine with high accuracy whether or not a flicker is 100 Hz from the positions of the plots.

Figure 7B:
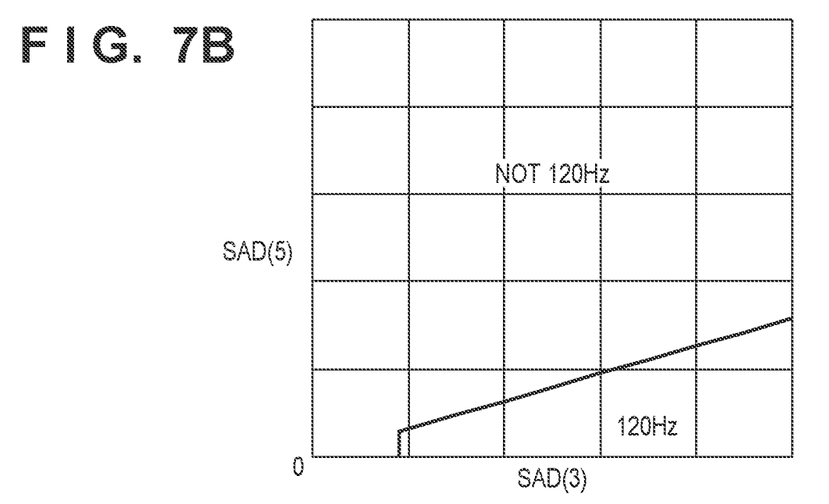

Similarly, whether or not a flicker is 120 Hz can be determined by dividing the region of the plane as illustrated in FIG. 7B with SAD(3) on the horizontal axis and SAD(5) on the vertical axis.

The lines dividing the regions illustrated in FIGS. 7A and 7B are merely examples; and the disclosure is not limited to the slopes thereof and points at which they bend.

The presence or absence of a flicker of 100 Hz can be determined from the plot positions in the plane illustrated in FIG. 7A, and the presence or absence of a flicker of 120 Hz can be determined from the plot positions in the plane illustrated in FIG. 7B; finally, a process of integrating these determination results is performed.

Figure 7C:
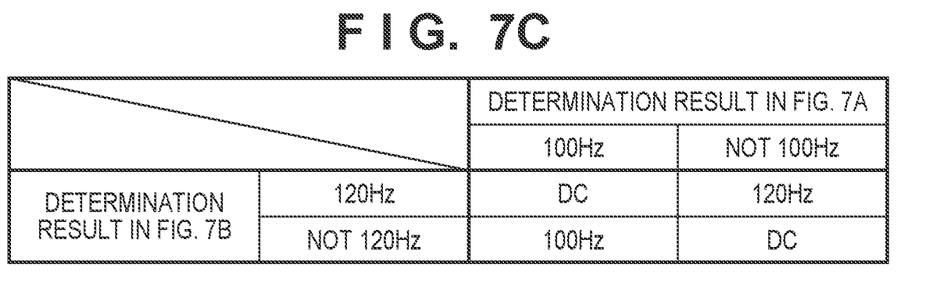

The integration process is performed based on the table illustrated in FIG. 7C. Hereinafter, the table will be described. When a flicker of 100 Hz is present, the determination result of FIG. 7A is "100 Hz" and the determination result of FIG. 7B is "not 120 Hz"; therefore, the lower left box of FIG. 7C is "100 Hz". Based on the same concept, the upper right box of FIG. 7C is "120 Hz".

If no flicker is present and DC-like steady light is the subject, the photometric value does not change over time, where $$AE(1) \approx AE(2) \approx AE(3) \approx \ldots \approx AE(12)$$

Therefore, $$SAD(6) \approx SAD(5) \approx SAD(3) \approx 0$$

holds. In other words, in a DC-environment, plots are obtained near the origins of both planes in FIGS. 7A and 7B; the determination result of FIG. 7A is not 100 Hz, and the determination result of FIG. 7B is not 120 Hz. Therefore, the lower right box of the table in FIG. 7C is determined to be DC whose brightness does not change.

Assume a case where the upper left box of the table in FIG. 7C is both "100 Hz" and "120 Hz". Normally, it is unlikely that such a determination result is obtained; however, if subjects while AE(1) to AE(12) are being acquired are not the same due to a subject moving, a panning operation, or the like, such a result may be obtained. Therefore, in such a case, determination of DC is made in the sense of a flicker detection error. In step S107, the system control unit 102 determines the presence or absence and the frequency of flicker as described above.

Although this concludes the detailed description of flicker determination, here, using FIG. 7A, description will be given for being able to detect flicker more stably the larger the amplitude of the flicker. As already described, the larger the amplitude of the flicker, the larger the value of SAD(3). SAD(3)=A as illustrated FIG. 7A is present as a determination threshold for flicker; however, a detectable amplitude of flicker is determined by this threshold. That is, the flicker whose amplitude is small becomes SAD(3)<A and cannot be determined as a flicker. Therefore, if the value of A is decreased, smaller flickers can be detected; however, as already described, in a DC environment (where there is no flicker), plots are obtained near the origin. Even under a DC environment, there are cases where, especially in a dark state, AE(1)≈AE(2)≈AE(3)≈ . . . ≈AE(12) does not hold due to noise and distribution spreads over the origin. Therefore, if the value of A is too small, under a DC environment, erroneous determination that there is flicker may be made. In other words, there is a limit to reducing the value of A. However, if the exposure period is made as short as possible as in the flicker linear graphs in FIGS. 5A to 5C, the amplitude of the flicker will be superficially detected to be large; in conjunction with this, the value of SAD(3) also increases, and even at the same value of A, it becomes possible to detect up to the flicker of smaller amplitude.

In addition, it is assumed that, in an environment where a flicker of 100 Hz is present, when a flicker is detected a plurality of times, plots are obtained in the area indicated by B of FIG. 7A. If it is an environment where an ideal flicker of 100 Hz is present, SAD(6)≈0; therefore, the area indicated by B will be located at the lower end of the graph. However, when actually capturing the images for flicker detection in step S106, there are disturbances, such as the focusing lens 202 of the photographing lens moving, the user panning, and the subjects changing, in order to maintain the live view display at a proper focus. If there is a disturbance, the same shapes of change in the amount of light will not be observed for two cycles such as in FIG. 6A; the shapes of the graph of the first cycle and the second cycle will change Therefore, SAD(6)≈0 will not hold, and SAD(6)>0; for example, the plots shift to the area indicated by C in FIG. 7A. Since the area of C crosses the determination threshold, there are cases where it is erroneously determined that there is no flicker. However, even in such cases, if the exposure period is made as short as possible by using the flicker linear graph of FIGS. 5A to 5C, the value of SAD(3) becomes larger. Thus, areas B and C are observed as areas B' and C' respectively, achieving an effect that it is less likely that it will be erroneously determined that there is no flicker. While the above is an example in an environment where a flicker of 100 Hz is present, the same applies to an environment where a flicker of 120 Hz is present.

After the flicker has been detected in step S107, in step S108, the system control unit 102 performs photometry using the image for live view acquired in a set with the images for flicker detection acquired in step S106. Then, the process returns to step S103.

Meanwhile, if 200 ms has not elapsed in step S104 since the timing at which photometry has been last performed, the system control unit 102 advances the process to step S109. If 200 ms has not elapsed since the timing at which photometry has been last performed, generally, the process directly returns to step S103 for live view image capturing of the next frame to be performed. By repeating steps S103 to S109, the process of continuing live view display while performing photometry and flicker detection once every six frames is realized. However, when an image capturing instruction operation by the user is inputted in step S109 along the way, the system control unit 102 interrupts the live view operation and switches the process to the sequence of the image capturing operation in step S110. Since the image capturing operation in step S110 is not directly related to the spirit of the disclosure, description thereof will be omitted.

As described above, in the present embodiment, the shutter speed (exposure period) is set to be on the shorter-seconds side for subjects of the same brightness when capturing the images for flicker detection than when capturing a still image or live view image. This increases the superficial amplitude of the flicker, enabling stable detection of the flicker.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-071334 filed Apr. 20, 2021, which is hereby incorporated by reference herein in its entirety.

What is claimed is:

1. An apparatus comprising:
a sensor configured to capture a subject;
at least one processor; and a memory coupled to the at least one processor, the memory having instructions that, when executed by the processor, performs operations as:
a control unit configured to perform exposure control for when capturing a subject using the sensor by adjusting at least an accumulation period, a diameter of an aperture of a diaphragm, and an image capturing sensitivity,
wherein the control unit performs exposure control based on a program chart that indicates a correspondence between an amount of light incident on the sensor, an exposure period of the sensor, an image capturing sensitivity, and an aperture value, and
wherein the control unit, in a case of capturing a subject to obtain an image for detection, which is an image for detecting a flicker by using the sensor, performs exposure control by prioritizing increasing an image capturing sensitivity and opening the aperture of the diaphragm rather than increasing an accumulation period of the sensor.

2. The apparatus according to claim 1, wherein the control unit performs the exposure control such that the image for detection becomes a proper exposure.

3. The apparatus according to claim 1, wherein the control unit, in exposure control for a case of capturing subjects of the same brightness, performs exposure control by prioritizing increasing an image capturing sensitivity and opening the aperture of the diaphragm rather than increasing an accumulation period of the sensor for a case of acquiring the image for detection by using the sensor than for a case of capturing a still image or acquiring an image for displaying a live view by using the sensor.

4. The apparatus according to claim 1, wherein the control unit is able to control the accumulation period by an electronic shutter operation using the sensor.

5. The apparatus according to claim 1, wherein the control unit, in a case of acquiring the image for detection using the sensor, fixes the accumulation period to a shortest accumulation period of the sensor, and in a case where a brightness of a subject becomes dark, increases an image capturing sensitivity in addition to opening the aperture of the diaphragm.

6. The apparatus according to claim 5, wherein the control unit, in a case where a brightness of a subject becomes dark when the aperture of the diaphragm is in a full-open state and the capturing sensitivity is an upper limit value on a high-sensitivity side, increases the accumulation period of the sensor.

7. The apparatus according to claim 5, wherein the control unit, in a case of acquiring the image for detection by using the sensor, after entering a state in which the aperture of the diaphragm is full-open, increases an image capturing sensitivity.

8. The apparatus according to claim 1, wherein the at least one processor or circuit is configured to further function as:
a control unit configured to cause the sensor to repeatedly execute an operation of a set, the set being a plurality of times of capturing for acquiring an image for displaying live view and a plurality of images for detection.

9. A method of controlling an apparatus having a sensor configured to capture a subject, the method comprising:
performing exposure control for when capturing a subject using the sensor by adjusting at least an accumulation period, a diameter of an aperture of a diaphragm, and an image capturing sensitivity,
wherein in the exposure control, exposure control is performed based on a program chart that indicates a correspondence between an amount of light incident on the sensor, an exposure period of the sensor, an image capturing sensitivity, and an aperture value, and
wherein in the exposure control, in a case of capturing a subject to obtain an image for detection, which is an image for detecting a flicker by using the sensor, exposure control by prioritizing increasing an image capturing sensitivity and opening the aperture of the diaphragm rather than increasing an accumulation period of the sensor is performed.

10. The method according to claim 9, wherein the performing performs the exposure control such that the image for detection becomes a proper exposure.

11. The method according to claim 9, wherein the performing, in exposure control for a case of capturing subjects of the same brightness, performs exposure control by prioritizing increasing an image capturing sensitivity and opening the aperture of the diaphragm rather than increasing an accumulation period of the sensor for a case of acquiring the image for detection by using the sensor than for a case of capturing a still image or acquiring an image for displaying a live view by using the sensor.

12. The method according to claim 9, wherein the performing is able to control the accumulation period by an electronic shutter operation using the sensor.

13. The method according to claim 9, wherein the performing, in a case of acquiring the image for detection using the sensor, fixes the accumulation period to a shortest accumulation period of the sensor, and in a case where a brightness of a subject becomes dark, increases an image capturing sensitivity in addition to opening the aperture of the diaphragm.

14. A non-transitory computer readable storage medium operable to store a program for causing a computer to execute a method of controlling an apparatus having a sensor configured to capture a subject, the method comprising:
performing exposure control for when capturing a subject using the sensor by adjusting at least an accumulation period, a diameter of an aperture of a diaphragm, and an image capturing sensitivity,
wherein in the exposure control, exposure control is performed based on a program chart that indicates a correspondence between an amount of light incident on the sensor, an exposure period of the sensor, an image capturing sensitivity, and an aperture value, and
wherein in the exposure control, in a case of capturing a subject to obtain an image for detection, which is an image for detecting a flicker by using the sensor, exposure control by prioritizing increasing an image capturing sensitivity and opening the aperture of the diaphragm rather than increasing an accumulation period of the sensor is performed.

15. The non-transitory computer readable storage medium according to claim 14, wherein the performing performs the exposure control such that the image for detection becomes a proper exposure.

16. The non-transitory computer readable storage medium according to claim 14, wherein the performing, in exposure control for a case of capturing subjects of the same brightness, performs exposure control by prioritizing increasing an image capturing sensitivity and opening the aperture of the diaphragm rather than increasing an accumulation period of the sensor for a case of acquiring the image for detection by using the sensor than for a case of capturing a still image or acquiring an image for displaying a live view by using the sensor.

17. The non-transitory computer readable storage medium according to claim 14, wherein the performing is able to control the accumulation period by an electronic shutter operation using the sensor.

18. The non-transitory computer readable storage medium according to claim 14, wherein the performing, in a case of acquiring the image for detection using the sensor, fixes the accumulation period to a shortest accumulation period of the sensor, and in a case where a brightness of a subject becomes dark, increases an image capturing sensitivity in addition to opening the aperture of the diaphragm.

* * * * *